(12) United States Patent
Sturm et al.

(10) Patent No.: US 12,478,920 B2
(45) Date of Patent: Nov. 25, 2025

(54) STORAGE AND DELIVERY VESSELS AND RELATED METHODS

(71) Applicant: ENTEGRIS, INC., Billerica, MA (US)

(72) Inventors: Ed A. Sturm, New Milford, CT (US); Joe R. Despres, Middletown, CT (US)

(73) Assignee: ENTEGRIS, INC., Billerica, MA (US)

( * ) Notice: Subject to any disclaimer, the term of this patent is extended or adjusted under 35 U.S.C. 154(b) by 532 days.

(21) Appl. No.: 17/945,849

(22) Filed: Sep. 15, 2022

(65) Prior Publication Data
US 2023/0080027 A1 Mar. 16, 2023

Related U.S. Application Data

(60) Provisional application No. 63/245,007, filed on Sep. 16, 2021.

(51) Int. Cl.
| | | |
|---|---|---|
| *B01D 53/22* | (2006.01) | |
| *B01D 71/12* | (2006.01) | |
| *B01D 71/26* | (2006.01) | |
| *C23C 16/04* | (2006.01) | |
| *C23C 16/18* | (2006.01) | |
| *C23C 16/455* | (2006.01) | |

(52) U.S. Cl.
CPC ........... *B01D 53/228* (2013.01); *B01D 71/12* (2013.01); *B01D 71/261* (2022.08); *C23C 16/045* (2013.01); *C23C 16/18* (2013.01); *C23C 16/45527* (2013.01)

(58) Field of Classification Search
USPC .................. 96/4; 95/45; 55/385.4; 220/581; 206/0.6; 222/3
See application file for complete search history.

(56) References Cited

U.S. PATENT DOCUMENTS

| | | | |
|---|---|---|---|
| 4,701,187 A | 10/1987 | Choe et al. | |
| 6,007,609 A * | 12/1999 | Semerdjian | F16K 1/305 |
| | | | 222/189.1 |
| 6,089,027 A * | 7/2000 | Wang | F17C 7/00 |
| | | | 62/48.1 |
| 6,110,257 A * | 8/2000 | Tom | F17C 13/025 |
| | | | 96/147 |
| 6,378,570 B1 * | 4/2002 | Shipachev | F17C 13/04 |
| | | | 141/3 |
| 6,857,447 B2 | 2/2005 | Olander et al. | |
| 6,911,065 B2 * | 6/2005 | Watanabe | F17C 5/00 |
| | | | 96/138 |
| 7,396,381 B2 * | 7/2008 | Graham | F17C 11/00 |
| | | | 222/3 |

(Continued)

FOREIGN PATENT DOCUMENTS

| | | |
|---|---|---|
| CN | 102430347 B | 1/2013 |
| CN | 104313316 B | 7/2016 |

(Continued)

OTHER PUBLICATIONS

V. M. Vorotyntsev et al., Germane high purification by membrane gas separation, Desalination, 200, 2006, pp. 232-233.

*Primary Examiner* — Duane Smith (57) ABSTRACT

Described are methods, systems, and apparatus for processing a gas mixture that contains at least two gases by contacting the gas mixture with a membrane that allows for preferential flow of one of the gases through the membrane, to separate one constituent gas from the mixture.

13 Claims, 8 Drawing Sheets

(56) References Cited

U.S. PATENT DOCUMENTS

| | | | |
|---|---|---|---|
| 9,552,990 B2 | 1/2017 | Sinha et al. | |
| 2006/0000850 A1* | 1/2006 | Vincent | B01D 46/4272 |
| | | | 222/3 |
| 2007/0031325 A1* | 2/2007 | Carruthers | B01D 53/228 |
| | | | 422/243 |
| 2008/0017524 A1* | 1/2008 | Powell | F17C 11/00 |
| | | | 206/0.6 |
| 2011/0132915 A1* | 6/2011 | Stuhlbacher | F17C 5/06 |
| | | | 141/1 |
| 2012/0097879 A1* | 4/2012 | Gilbert | A61M 16/20 |
| | | | 251/309 |
| 2013/0032028 A1* | 2/2013 | Miyazawa | B01D 53/22 |
| | | | 95/55 |
| 2015/0329341 A1* | 11/2015 | Wilder | F17C 1/00 |
| | | | 206/0.6 |
| 2018/0190492 A1* | 7/2018 | Qiu | B01D 53/22 |
| 2021/0071818 A1 | 3/2021 | Arno | |
| 2023/0080027 A1* | 3/2023 | Sturm | C23C 16/045 |
| | | | 95/45 |

FOREIGN PATENT DOCUMENTS

| | | | |
|---|---|---|---|
| JP | 2011230035 A | 11/2011 | |
| JP | 2013180229 A | 9/2013 | |
| TW | 350787 B | 1/1999 | |
| TW | 201632251 A | 9/2016 | |
| WO | 199959700 A1 | 11/1999 | |

\* cited by examiner

STORAGE AND DELIVERY VESSELS AND RELATED METHODS

CROSS-REFERENCE TO RELATED APPLICATIONS

This application claims the benefit under 35 USC 119 of U.S. Provisional Patent Application No. 63/245,007, filed Sep. 16, 2021, the disclosure of which is hereby incorporated herein by reference in its entirety.

FIELD

The description relates to methods, systems, and apparatus for processing a gas mixture that contains at least two gases by contacting the gas mixture with a membrane that allows for preferential flow of one of the gases through the membrane.

BACKGROUND

Gaseous raw materials (referred to sometimes as "reagent gases") are needed in a range of industries and industrial applications, including in the pharmaceutical industry, the electronics industry (e.g., in preparing microelectronic and semiconductor devices), and in the petrochemical industry.

Some examples of industrial applications of reagent gases include for processing semiconductor materials or microelectronic devices such as ion implantation, expitaxial growth, plasma etching, reactive ion etching, metallization, physical vapor deposition, chemical vapor deposition, atomic layer deposition, plasma deposition, photolithography, cleaning, and doping, among others. These processes may be used for manufacturing semiconductor, microelectronic, photovoltaic, and flat-panel display devices and products, among others.

Examples of reagent gases used in semiconductor and microelectronic device manufacturing include silane ($SiH_4$), germane ($GeH_4$), ammonia ($NH_3$), phosphine ($PH_3$), arsine ($AsH_3$), diborane ($B_2H_6$), stibine ($SbH_3$), hydrogen sulfide ($H_2S$), hydrogen selenide ($H_2Se$), hydrogen telluride ($H_2Te$), halide (chlorine, bromine, iodine, and fluorine) compounds, among others.

Many of reagent gases are stored, transported, handled, and used with a high level of care and with many safety precautions. Many hydrides are highly reactive and flammable, potentially being spontaneously flammable in air or subject to deflagration. To reduce the risk of a spontaneous fire or deflagration, many reagent gases that are highly reactive are stored and transported in a substantially diluted form along with a "stabilizer" gas (a.k.a. a "diluent" or "diluent gas"). The reagent gas is contained in a storage vessel, often under pressure, along with a "stabilizing" gas such as nitrogen, argon, helium, or hydrogen that dilutes the concentration of the highly reactive reagent gas to reduce the risk of a fire or deflagration.

Typical systems for storing and transporting a reagent gas, including high reactive reagent gases such as hydrides, include a high pressure gas cylinder that contains a reagent gas diluted with inert "stabilizing" gas. The presence of the stabilizing gas reduces the potential of deflagration, explosion, decomposition, or other manners of instability which may pose a threat to the handler, transporter, or a warehouse storage facility, etc. For example, hydrogen can be a stabilizing gas for a reactive hydride.

SUMMARY

While systems for storing and handling reagent gas as part of a mixture with a stabilizing gas have been shown to be effective, efficient, and acceptably safe, the presence of the stabilizing gas delivered with the regent gas reduces the utility and value of the delivered reagent gas.

The stored reagent gas is intentionally impure and substantially diluted. As one significant disadvantage, the stored diluted gas has a reduced concentration, which may cause a reduced level of usefulness of the reagent gas for certain types of processing, for example ion implantation, deposition processes such as chemical vapor deposition, atomic layer deposition, etc. The presence of a large amount of stabilizing gas reduces the utility and value of the diluted raw material gas. To provide desired safety purposes, a diluent gas is typically present in a stored gas mixture in an amount of at least 50 percent. But some processes such as many deposition techniques (chemical vapor deposition, atomic layer deposition) and ion implantation, among others, can be performed with greater efficiency or with better product quality by using a reagent gas having a concentration that is higher than 50 percent. For various advanced deposition techniques, for example for deposition steps used to form a 3D NAND memory device, which requires a material to be deposited onto a surface with high aspect ratio openings, a reagent gas that has a concentration above 50 percent (e.g., at least 60, 70, 80, or 90 percent) can produce better deposited layers, e.g., deposited layers that are more uniform, and more evenly-deposited over three-dimensional, high aspect ratio surfaces.

Additionally, a stored gas that is diluted may suffer from non-uniformity when delivered from a storage vessel. Reasons include: potential instability of a stored gas mixture during storage; un-known impurity levels in a stored gas mixture when gas is added to the storage vessel and when the mixture is delivered; and an un-known period of storage of the stored gas. During a storage period, the chemical contents of a stored gas mixture may change, such as by degradation. A user of the gas mixture will not be aware of the degree of change, but the change may significantly affect performance of the stored reagent gas. In certain types of deposition processes, a lower-than-expected concentration of a reagent gas in a gas mixture can significantly impact yield of a deposition process. To compound the problem, the reason for the reduced yield will not be immediately apparent, and a result is downtime on the machine, which can be very costly.

Processes of manufacturing semiconductor and microelectronic devices require the highest possible levels of control of the chemical makeup of raw materials, to produce extremely precise control of product features of a processed product, which may be an implant concentration, a film layer thickness, or another product feature. Such product features control or affect a function of the product such as an electrical property of a semiconductor wafer or wafer component such as a microchip or other microelectronic device. Even the smallest variability in a concentration of a raw material used to produce the product can require additional process control measures to produce required raw material uniformity, or may result in reduced quality or reduced fabrication rates. Improved uniformity of a reagent gas used as a raw material may allow for improved process control of a manufacturing step, improved quality, or improved consistency in quality of processed products.

In one aspect, the invention relates to a method of processing a stored gas mixture contained in a storage vessel. The stored gas mixture includes reagent gas and diluent gas. The method includes: contacting the stored gas mixture with a separation membrane that allows preferential flow of the diluent gas through the separation membrane relative to the reagent gas; and, allowing a portion of the diluent gas of the stored gas mixture to flow through the separation membrane to produce a concentrated reagent gas having an increased concentration of the reagent gas compared to the stored gas mixture.

In another aspect, the invention relates to a system for delivering reagent gas. The system comprises a storage vessel comprising a storage vessel interior and an opening that is connected to the storage vessel interior, and a separation membrane that allows preferential flow of gas having a lower kinetic diameter through the separation membrane relative to gas having a higher kinetic diameter, connected to the storage vessel interior.

All figures are schematic, not necessarily to scale, and are exemplary and not to be considered as limiting the present description.

DETAILED DESCRIPTION

The following describes methods, systems, and apparatus for processing a gas mixture for a purpose of separating one gas in the mixture from the mixture, i.e., for separating one gas in a mixture from one or more different gases that are also in the gas mixture.

The gas mixture contains at least two different gases, and the process includes contacting the gas mixture with a membrane that is effective to separate a component gas of the gas mixture from the mixture of gases. The membrane is of a type that when contacted by the gas mixture allows one type of gas molecule in the mixture to flow through the membrane more easily, and allows a different gas molecule of the gas mixture to flow through the membrane less easily. The membrane allows for preferential or selective flow through the membrane of one of the gases of the gas mixture compared to a different gas also contained in the gas mixture.

Membranes that have a property of allowing a preferential flow (or "selective flow") of one type of gas that is contained in a mixture of two or more gases, through the membrane, are known. Example membranes are synthetic permeable membranes (e.g., films or barriers) through which different gaseous molecules may pass at different rates, or not at all. A membrane may be porous, nanoporous, polymeric, and different types of gas molecules may pass through the membrane at different rates according to size, diffusivity, or solubility of the gas molecule.

A membrane that is useful to perform a separation (sometimes referred to herein as a "separation membrane") can work to separate gas molecules of a gas mixture by any effective mechanism. The present description is not limited by the manner in which a separation membrane allows or causes preferential (i.e., selective) flow of different types of gas molecules through the membrane.

One potential separation mechanism may be based on differences with which differently-sized gas molecules will physically pass through openings in a separation membrane that are of a particular size or a maximum size. The degree to which a particular type of gas molecule passes through a separation membrane may depend on an effective size of a gas molecule relative to a size of openings in the separation membrane. Effective sizes of gas molecules may be characterized as "kinetic diameter" of the gas molecule. A useful separation membrane may allow gas molecules of a certain maximum size (e.g., kinetic diameter) to easily pass through openings in the separation membrane, while gas molecules with relatively larger kinetic diameters are substantially or entirely prevented from passing through the separation membrane. Such a membrane is said to exhibit "preferential flow" or "selective flow" through the membrane of the gas molecules having the smaller kinetic diameter compared to the gas molecule having the larger kinetic diameter.

Figure 1:
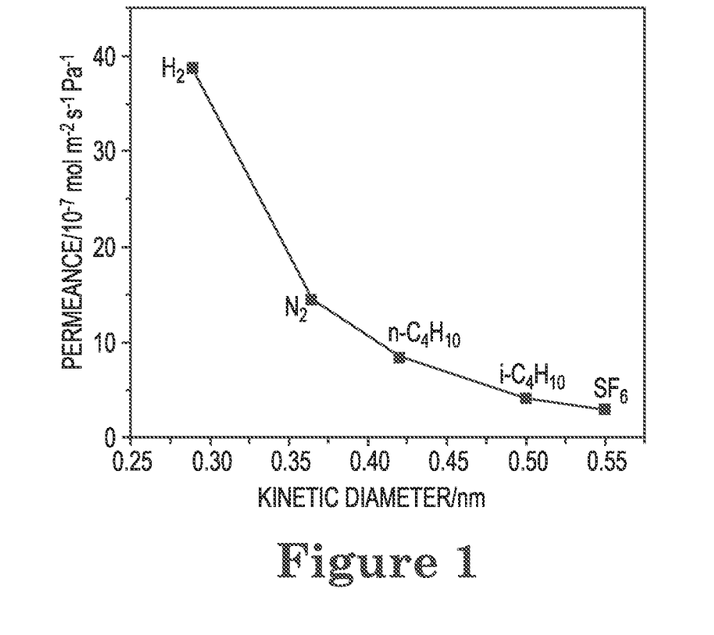
FIG. 1 shows a graph that relates permeance of a gas molecule to size, measured as kinetic diameter of the molecule.

FIG. 1 shows examples of permeance values of gas molecules of different sizes (based on kinetic diameter) through an example separation membrane. Permeance is the transmission rate through a given thickness of a given separation membrane by a given fluid (gas or liquid). Permeance of a compound (e.g., a gas species) is dependent on the type of separation membrane and is a property of the paired gas and membrane, at a certain set of conditions. The graph at FIG. 1 shows data of observed permeance through an inorganic silicalite-2 zeolite membrane of a 3.8 micron thickness. The data generally indicate that molecules having smaller kinetic diameters pass more easily through the membrane, i.e., have a higher permeance, relative to molecules having greater kinetic diameters. Permeance, or "permeation rate," of different molecules depends on the kinetic diameter of the gas molecules, but possibly also on factors that may include diffusivity, gas solubility, membrane thickness and temperature, and possibly to some extent by gas pressure. This data suggest selectivity ratios between select gas pairs of as high as 9:1 or 13:1. (Chemistry Letters 2015, 44, 1592-1594).

"Selectivity," or a "selectivity ratio," refers to a ratio of a permeance of one gas in a gas mixture to permeance of a second gas in the gas mixture. In examples of methods as described, a selectivity ratio of a first gas that is a diluent gas (or stabilizing gas) in a gas mixture, to a second gas that is a reagent gas, may be at least 3, 5, 10, or 15, meaning that the permeance of the first (stabilizing or diluent) gas may be at least 3, 5, 10, or 15 times the permeance of the second (reagent) gas.

Various examples of separation membranes have been previously described, as well as the use of certain separation membranes for removing an impurity from a gas that contains the impurity at a very low concentration. See, for example, Vorotyntsev, Vladimir M., et al., *Germane high purification by membrane gas separation*, Desalination 200 (2006) 232-233; Vorotyntsev, V. M., et al., *High purification of substances by a gas separation method*, Desalination 240 (2009) 301-305. Though the Vorotyntsev articles are focused on membrane separations for removing trace level contaminants from high purity gas streams (e.g., greater than 99 percent purity), membranes described in these articles may be useful in methods of the present description, for separating gases from a gas mixture that contains two gases at concentrations that are higher than amounts typical of impurities, e.g., two gases that are both present at a concentration of at least 5, 10, 20, or 30 percent of a gas mixture. For these types of gas mixtures, the same or similar types of membranes may be used in a separation method, but optionally with one or more adjusted process features to increase permeance of a stabilizing gas through the membrane, or to increase selectivity of the membrane to allow a higher rate (higher permeance) of a stabilizing or diluent gas relative to a reagent gas. Process features that may be adjusted include membrane thickness, gas temperature, gas flow rate, among others.

Separation membranes may be made of any useful material and are conventionally in the form of thin, porous sheet or film structures, or hollow tubes. Many separation membranes are polymeric, and formed from polymers such as polydimethyl siloxane, acetate cellulose, polytetrafluoroethylene or a perfluorinate sulfocationite. Other examples may be formed of ceramic materials or may be in the form of a film formed of crystalline zeolite, or metal-organic framework, nanoparticle silica, nanoporous carbon membranes, perovskites, precious metals, polyimides, polysulfones, cellulose acetate, polyaramids, polyethylene, polyphenylene oxide, etc. Separation membranes are also commercially available. Examples of commercial membranes include those sold by Air Products' (PRISM Membranes), and those sold by Fuji Chemicals (FUJIFILM), as well as others sold by IGS, Praxair, Air Liquide, Parker Gas Separation, Ube, NATCO, Kvaerner, among others.

A gas mixture of a process as described can be a mixture of any two gases, with one of the gases having a size (e.g., kinetic diameter), chemistry, or other physical or chemical property that allows molecules of the gas to pass through a separation membrane at a first passage rate, while a second gas in the gas mixture has properties that do not allow the gas to pass through the separation membrane at all, or that allow the second gas to pass through the membrane at a passage rate that is lower than the first passage rate.

A useful separation membrane is one that is effective to at least partially separate a gas from a gas mixture. The membrane need not allow all gas molecules of a gas mixture that have a particular type or size to pass through the membrane, and need not prevent all gas molecules in a gas mixture of a different size or type from passing through the membrane entirely. A membrane may be effective as a separation membrane if the membrane allows easier passage (higher permeance) of one gas of the gas mixture through the membrane compared to a different gas of the gas mixture. In particularly useful or preferred methods as described, one type of gas molecule of a gas mixture (e.g., a diluent or stabilizing gas) may pass through the membrane at a rate (permeance) that is at least 3, 5, 10, 15, 25, 30, 50, or 100 times a rate at which a second gas molecule (e.g., a reagent gas) of the gas mixture passes through the membrane, the rate being independent of the concentration of the two individual gases in the gas mixture. For example, this means that when two different types of gas molecules are present at equal concentrations in a gas mixture that contacts the membrane, with a reduced pressure condition on the opposite side of the membrane, the first molecule will have a rate of passage (permeance) through the membrane that is at least 3, 5, 10, 15, 25, 30 50, or 100 times a rate at which the second gas molecule passes through the membrane.

Figure 2:
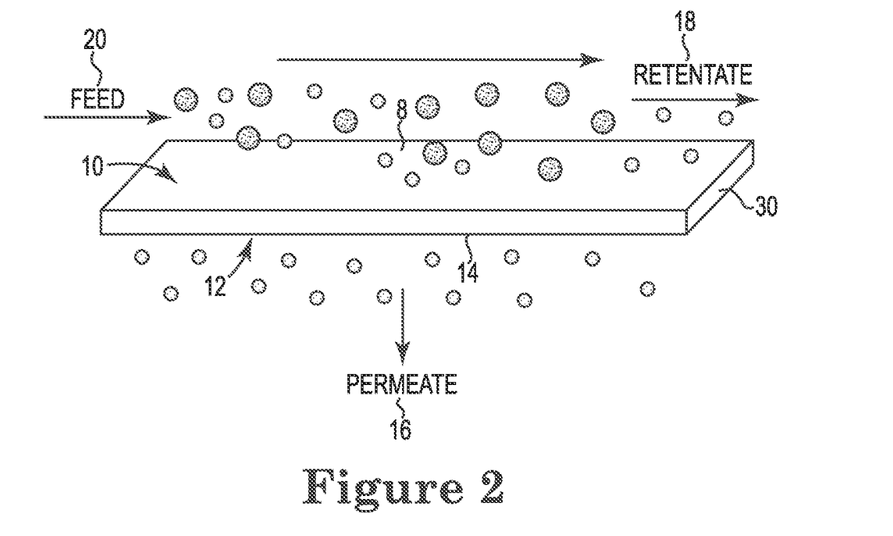
FIG. 2 shows a diagram of a separation process as described.

FIG. 2 schematically illustrates a method of using a separation membrane to separate, meaning to at least partially separate, one type of gas (a "constituent gas") from a gas mixture that contains two (or more) types of constituent gases. As shown at FIG. 2, gas mixture (feed) 20 contains at least two different types of gases, shown as two differently-sized gas molecules. A first type of gas is made of relatively larger gas molecules, represented by the larger spheres of feed (gas mixture) 20. A second type of gas is made of relatively smaller gas molecules represented by the smaller spheres of gas mixture 20. The first gas, of the larger molecules, may be a high-value gas such as a reagent gas. The second gas, of the smaller molecules, may be a gas that is different from the first gas, and may be, for example, a diluent gas.

Gas mixture 20 is contained in a feed side space 8 of a gas storage or gas flow system, where gas mixture 20 contacts a "feed side" (or "interior side" or "retentate side") surface 10 of separation membrane 30. At FIG. 2, gas mixture 20 is shown to exhibit a flow in a direction of the arrows (from left to right), such as in a direction driven by a higher gas pressure (at the left) to a lower gas pressure (on the right) of feed side space 8. This flow of gas mixture 20 past (along or over) feed side surface 10 of separation membrane 30 is optional and not required. In alternate methods and systems (see for example FIGS. 3B and 3C), gas mixture 20 may be in static contact with feed side 10 of separation membrane 30.

Still referring to FIG. 2, on a second side of membrane 30, opposite of feed side surface 10 is permeate side surface 12 and permeate side space 14. In use, a gas pressure within permeate space 14 is reduced relative to a gas pressure within feed space 8. The second gas of the gas mixture is of a type or size (e.g., kinetic diameter) that allows the second gas to pass more easily through membrane 30 compared to the larger first gas. With the reduced pressure existing in permeate space 14, at least some of the molecules of the second gas pass through membrane 30 from feed side space 8 into permeate space 14 to form gaseous permeate 16, which contains a very high concentration of the second gas, e.g., at least 80, 90, 95, 99, or 99.5 percent second gas. Within feed space 8, with at least a portion of the molecules of the second gas being removed from feed 20, a retentate (18) is formed from the remaining molecules of the first gas and possibly some remaining molecules of the second gas. The retentate (18) has a reduced concentration of the second gas relative to original feed 20, and a higher concentration of the first gas relative to original feed 20.

The types of different gases in the gas mixture may be any two different types of gases that may be effectively separated by a separation membrane as described. In certain specific example applications a gas mixture may be a combination of two different gases stored together as a mixture (a "stored gas mixture") in a single storage vessel that may be used to contain, ship, store, handle, or dispense the gas mixture. One of the gases can be a "high-value" gas that is useful in industry (for example a "reagent gas," herein). The second gas can be a gas that is contained in the storage vessel along with the high-value gas, e.g., to dilute the high-value gas for safety reasons. Each of the two different gases of the stored gas mixture can be present in the mixture in an amount that is greater than an amount of a gas that would be considered to be an impurity of a raw material reagent gas, e.g., each gas may be present in an amount that is greater than 0.01, 0.5, or 1 percent by volume.

A wide range of gaseous raw materials may be used as reagent gases in many different industries and industrial applications. Some examples include processes for manufacturing pharmaceuticals, processes used in the petrochemical industry, and processes of manufacturing semiconductor materials or microelectronic devices. Examples of processes for manufacturing semiconductor materials or microelectronic devices include: ion implantation, expitaxial growth, plasma etching, reactive ion etching, metallization, physical vapor deposition, chemical vapor deposition, atomic layer deposition, plasma deposition, photolithography, cleaning, and doping, among others, with these uses being included in methods for manufacturing semiconductor and microelectronic devices, including microchips, photovoltaic, and flat-panel display devices and products, among others.

Example reagent gases useful according to the present description include highly reactive inorganic hydrides, halides, halide compounds, and other gases that may be desirably stored in a diluted condition in combination with a different gas that functions as a diluent gas (or "stabilizer gas") as described herein. Specific examples of reagent gases include a variety of different types of general and specific gases that are known to be useful for processing semiconductor materials, microelectronic devices, etc. These include: methane ($CH_4$), acetylene ($C_2H_2$), ammonia ($NH_3$), water ($H_2O$), silane ($SiH_4$), germane ($GeH_4$), diphosphene ($P_2H_4$) phosphine ($PH_3$), arsine ($AsH_3$), diborane ($B_2H_6$), stibine ($SbH_3$), hydrogen sulfide ($H_2S$), hydrogen selenide ($H_2Se$), hydrogen telluride ($H_2Te$), digermane ($Ge_2H_6$), diacetylene ($C_4H_2$), halide (chlorine, bromine, iodine, and fluorine) compounds, among others.

The second gas of a stored gas mixture may be a gas that is included in a stored gas mixture in combination with a reagent gas to dilute the reagent gas and to reduce the risk of fire, explosion, self-deflagration, etc., of the reagent gas, or otherwise for a purpose of improved safety. In a stored gas mixture that includes a reagent gas in combination with a diluent gas that improves safety during storage, transport, and handling of the reagent gas, the second gas can be referred to as a "diluent" gas or a "stabilizing" gas.

Examples of diluent gases include inert gases such as nitrogen ($N_2$), argon, xenon, and helium; or could be hydrogen ($H_2$) to help stabilize hydride gases. For this application, a particularly useful diluent gas may be a gas that has a kinetic diameter that is smaller than a kinetic diameter of a reagent gas in the same gas mixture, with a difference in kinetic diameters of the diluent gas and the reagent gas being sufficiently large to allow the diluent gas to pass through a separation membrane at a rate that is higher than a rate (e.g., permeance) of passage of the reagent gas, e.g., a rate of passage of the diluent gas may be at least 3, 5, 10, 15, 25, 30, 50, or 100 times a rate of passage of a reagent gas in the mixture.

A stored gas mixture may contain two or more different gases (different gas molecules), at least one of which is a reagent gas and at least one of which is a diluent gas. Example stored gas mixtures may contain one reagent gas and two different diluent gases, with both of the diluent gas species having a significantly greater permeance through a separation membrane than the reagent gas. Alternately, a stored gas mixture may contain two different types (species) of reagent gases that could be delivered as a mixture, stored with a stabilizer or diluent gas that can be removed from the mixture of reagent gases before delivering the mixture of reagent gases to a process; both reagent gases have a significantly lower permeance through the separation membrane than the diluent gas species.

Alternate examples of useful stored gas mixtures may contain only two different types of gases, and not more than two, not including gaseous compounds that are present at extremely low amounts (below 0.1 or 0.01 percent), including any that are considered to be impurities.

Such example stored gas mixtures may consist of or consist essentially of a combination of only two different gases, for example a reagent gas and diluent gas as described. A stored gas mixture that consists essentially of two different gases, one gas being a reagent gas and another being a diluent gas, can contain one single type of reagent gas (not a combination of two different reagent gases) and one single type of diluent gas (not a combination of two different diluent gases), and not more than an insubstantial amount of any other gas besides the reagent gas and the diluent gas, for example not more than 5, 3, 2, 1, 0.5, 0.1, 0.01 percent of any gas or impurity that is different from the reagent gas and the diluent gas.

The amounts of first and second gases in a gas mixture that will be processed by a separation process as described can be any useful amounts. In certain example systems and methods the amount of a first gas and the amount of a second gas can both be higher than an amount of a gas that would be considered an impurity in a gas mixture, meaning the stored gas mixture may contain at least 0.5 or 1 percent of both a first gas and a second gas, based on a total amount of gas of a stored gas mixture.

In some example gas mixtures, a gas mixture contains at least 10, 20, 30, or 50 percent of a first gas that is of a size or chemical nature that substantially prevents the gas from passing through a particular separation membrane, and also contains at least 50, 70, 80, or 90 percent of a second gas that is of a size or chemical nature that allows the second gas to more easily pass through the same separation membrane.

According to more specific examples, in a stored gas mixture that includes a reagent gas as described in combination with a diluent gas as described, the amount of reagent gas in the stored gas mixture may be in a range from 5 to 90 percent, e.g., from 5 to 50 percent or from 10 to 30, 40, 50, 60 or 70 percent of the stored gas mixture. The stored gas mixture may contain from 10 to 95 percent diluent gas on a gas volume basis, e.g., from 50 to 95 percent diluent gas or from 30, 40, 50, 60, or 70 percent up to 90 percent of the stored gas mixture.

According to methods of the present description a gas mixture is stored in a storage vessel and, before or after being removed from the vessel, the gas mixture is contacted with a separation membrane to cause or allow a portion of the gas mixture to pass through the separation membrane to separate that portion of the gas from the gas mixture.

According to certain example storage systems and dispensing methods, a stored gas mixture is contained in a storage vessel, and different portions of the stored gas mixture are dispensed from the vessel interior as separate portions of the stored gas mixture, using multiple removal or dispensing steps to remove certain constituent gases from the stored gas mixture in different dispensing steps. The gas mixture at the vessel interior contacts a separation membrane and in one removal step (a "separation" step) one portion of the gas mixture (referred to as permeate) is removed from the vessel interior by being passed through the separation membrane. A remaining portion of the gas mixture (referred to as a retentate) remains in the vessel and can be delivered from the vessel without passing through the separation membrane. The membrane may be incorporated into (built into) the vessel, or may be connected externally through a flow control conduit to the vessel.

In other example systems, the vessel can include or be connected to a flow system that includes a separation membrane, and the stored gas mixture can be flowed along a flow path that causes the stored gas mixture to contact the separation membrane as the stored gas mixture is dispensed from the vessel. As a flow of the dispensed storage gas mixture passes by and contacts the separation membrane, a portion of the stored gas mixture (referred to as permeate) passes through the separation membrane and is removed from the gas mixture that contacts the separation membrane. The remaining portion of the gas mixture (referred to as a retentate) flows past the separation membrane without passing through the separation membrane, and contains a reduced amount of the permeate.

A stored gas mixture can be contained in any type of storage vessel. Common storage vessels for stored gas mixtures that contain a reagent gas are known and commercially available, and may be designed to contain a gas mixture at atmospheric pressure, at above atmospheric pressure, or at sub-atmospheric pressure.

The vessel may contain an adsorbent material onto which a stored gas can be adsorbed for storage, or the vessel may be empty of adsorbent material, i.e., contain no adsorbent material. Examples of useful types of adsorbents include carbon-based adsorbents, metal organic frameworks (MOF), zeolite, porous organic polymer (POP), and other adsorbent and combinations of two or more of these adsorbents. The type of adsorbent may be any adsorbent that is useful to store a gas mixture that contains reagent gas and a second gas, such as a stabilizing gas. In certain specific example systems, the adsorbent may be of a type that preferentially adsorbs reagent gas (e.g., germane, $GeH_4$ or another hydride) relative to a stabilizing gas (e.g., hydrogen or another inert gas). The adsorbent has a high affinity for adsorbing the reagent gas but a low affinity for adsorbing the stabilizing gas. The stabilizing gas, when contained in the vessel, will remain substantially or almost entirely non-adsorbed, as a gas in headspace of the vessel.

The vessel can contain a useful combination of flow control channels, pressure controls, flow control or metering devices, and valves connected to the enclosed interior of the vessel, to allow the vessel to be filled with a gas mixture, and to allow removal of the gases of the gas mixture from the vessel in a manner that uses a separation membrane to separate a component gas from the gas mixture.

According to certain example systems and methods, a separation membrane is incorporated into a storage vessel, e.g., at an interior of the vessel or at a head of the vessel, as part of a valve or a valve assembly. The vessel includes a flow path that passes from the vessel interior, through the separation membrane, and to a vessel exterior, to allow a portion of the gas mixture to pass through the separation membrane and become separated from the vessel interior and the remaining portion of the gas mixture. The flow path may be referred to as a "bleed path" that passes through a "bleed port" of the vessel, which can be opened and closed by actuating a "bleed valve." The portion of the gas that passes through the separation membrane is referred to as "permeate" and the portion of the gas that remains within the vessel is referred to as "retentate."

Example storage vessels may contain a bleed port that includes a separation membrane. Example vessels may also contain one or two valves not associated with the separation membrane, that each define a flowpath between a vessel interior and a vessel exterior that does not require a gas to pass through a separation membrane. If the vessel contains only one such valve, the valve may be used for both adding a gas to the vessel interior and for removing gas from the vessel interior. If the vessel contains two such valves, one of the valves can be used to add gas to the vessel interior and the second valve can be used to remove gas from the interior. The second valve may be associated with a pressure regulator and flow of gas through the second valve and between the vessel interior and a vessel exterior may be regulated by the pressure regulator.

Example storage vessels can include a vessel structure that includes an interior volume that is defined by structure that includes a bottom, sidewalls extending vertically from the bottom, and an upper portion that includes an opening. The opening provides access to the vessel interior and is a typical location for one or more valves. The sidewalls are commonly cylindrical. The vessel can be adapted to contain a gas that is under super-atmospheric pressure, sub-atmospheric pressure, or atmospheric pressure.

Figure 3A:
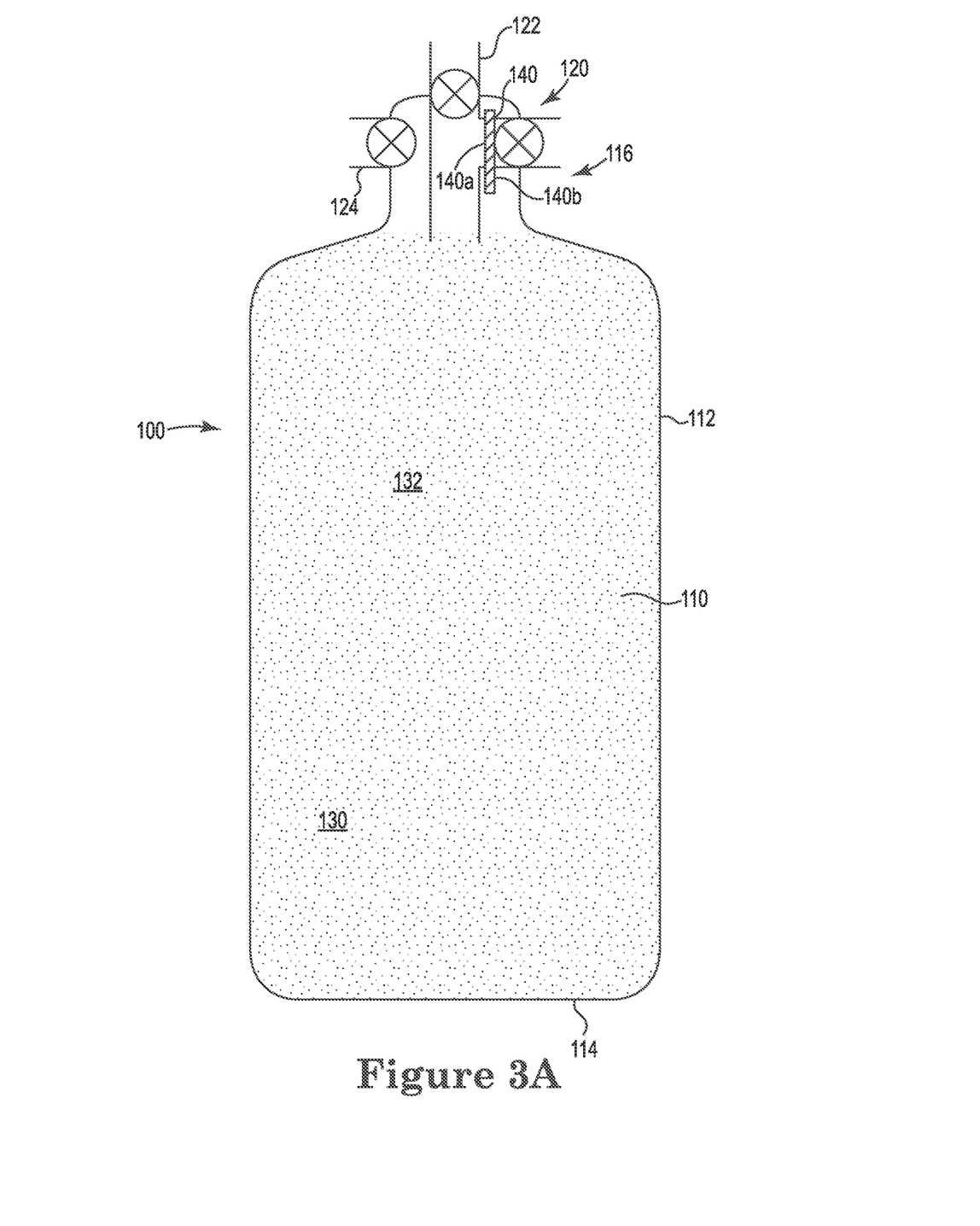
FIG. 3A shows an example storage vessel as described.

FIG. 3A shows an example of a vessel that can be useful to contain, store, and deliver a stored gas mixture that contains a first gas that is a reagent gas and a second gas that is a diluent, by contacting the stored gas mixture with a separation membrane that preferentially allows the diluent gas to pass through the membrane. The first and second gases are referred to and exemplified as being a "reagent gas" and a "diluent" gas, but may be any different types of gases.

Storage vessel 100 includes vessel container 110 defined by sidewalls 112 (which may be cylindrical), bottom 114, top opening (neck) 116, and at least two valves 120 and 122. A third valve 124 is illustrated, but optional.

Vessel interior 130 contains stored gas mixture 132, which contains a reagent gas and a diluent gas. Vessel interior 130 may or may not contain adsorbent (which is optional and not shown). As illustrated, the vessel contains no adsorbent and contains the stored gas mixture in an amount to produce a pressurized interior, e.g., interior 130 may have an interior pressure of at least 14, 25, 50, 100, or 200 pounds per square inch (absolute).

The stored gas mixture comprises constituent gases that include reagent gas and diluent gas. The stored gas mixture contains an amount of the diluent gas to allow for acceptably safe handling, storage, and transport of the stored gas mixture within pressurized container 100, e.g., the gas mixture contains at least 20, 30, 50, 60, or 70 percent diluent gas. The stored gas mixture contains an amount of the reagent gas that allows for acceptably safe handling, storage, and transport of the gas mixture within storage vessel 100, e.g., the gas mixture contains below 80, 70, 50, 40, or 30 percent reagent gas.

Storage vessel 100 includes separation membrane 140 in a flow path that also includes valve 120. Membrane 140 includes a feed side 140a (also referred to as a "retentate side") that contacts vessel interior 130 and stored gas mixture 132. The opposite side of membrane 140, permeate side 140b, leads to valve 120 and a vessel exterior.

In use, storage vessel 100 can be used to separate the diluent gas from the reagent gas of stored gas mixture 132, to produce a concentrated reagent gas (a "retentate") within interior 130. With valve 120 opened and other valves closed, a pressure gradient may be applied across membrane 140, to apply a reduced pressure to permeate side 140b relative to a higher pressure at interior 130 and at feed side 140a. With valve 120 open and the pressure differential across membrane 140, diluent gas from gas mixture 132 can pass through separation membrane 140 to be removed from interior 130 and separated from gas mixture 132. With an amount of the diluent gas removed, a concentrated reagent gas is formed and remains at interior 130. After forming the concentrated reagent gas, the concentrated reagent gas can be delivered through a different valve, e.g., through valve 122 or 124 to a downstream process.

By this method, a desired amount of diluent gas can be removed from interior 130 and separated from gas mixture 132. A useful amount of diluent gas removed from gas mixture 132 may be an amount that produces a concentrated reagent gas remaining in interior 130 that has a useful or desired concentration of the reagent gas. A desired concentration of reagent gas in a concentrated reagent gas may depend on a specific process with which the concentrated reagent gas will be used, e.g., deposition (chemical vapor deposition, atomic layer deposition), ion implantation, etc. For various advanced deposition techniques, for example for deposition steps for forming a 3D NAND memory device, a concentration of a reagent gas that is useful as a gaseous raw material in a deposition process can be relatively high, for example at least 50, 70, 90, or 95 percent reagent gas, as supplied to a deposition tool.

Still referring to FIG. 3A, after a desired amount of diluent gas is removed from interior 130 and separated from an original stored gas mixture 132, the concentrated reagent gas that remains can be delivered from storage vessel 100 to a process that uses the reagent gas as a gaseous raw material. The concentrated reagent gas may be delivered through valve 122, with optionally-regulated pressure or flow (not shown), from vessel 100 to a process that uses the concentrated reagent gas.

In an example vessel that includes only two valves, 120 and 122, valve 122 may be used for both dispensing a concentrated reagent gas from the vessel, and also for placing an original gas mixture (from which the concentrated reagent gas is formed by removal of diluent gas) into interior 130. In a different example, valve 124 may be used exclusively for dispensing a concentrated reagent gas from the vessel (e.g., through a pressure regulator), and a different valve, 122, is used to place the original gas mixture (from which the concentrated reagent gas is formed by removal of diluent gas) into interior 130.

Figure 3B:
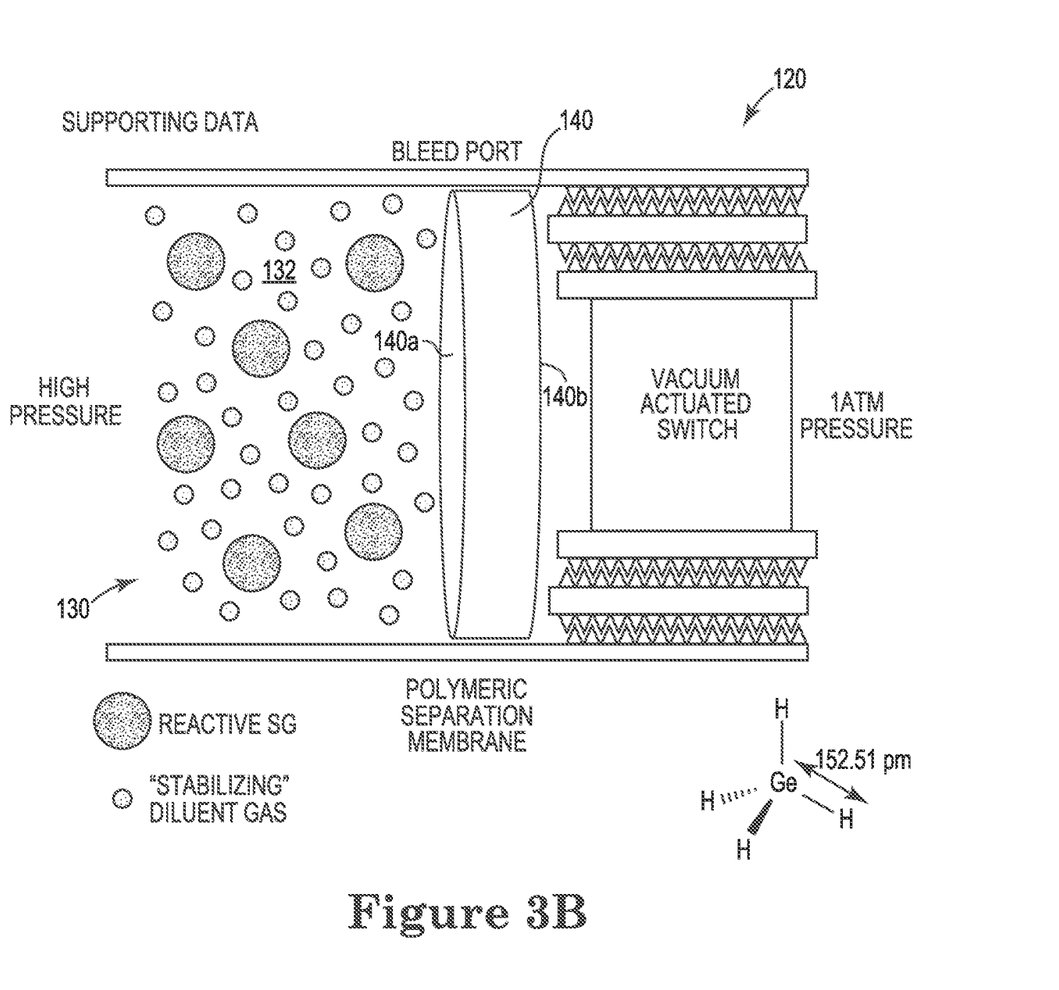
FIGS. 3B and 3C show example storage vessel components used in a method as described.
Figure 3C:
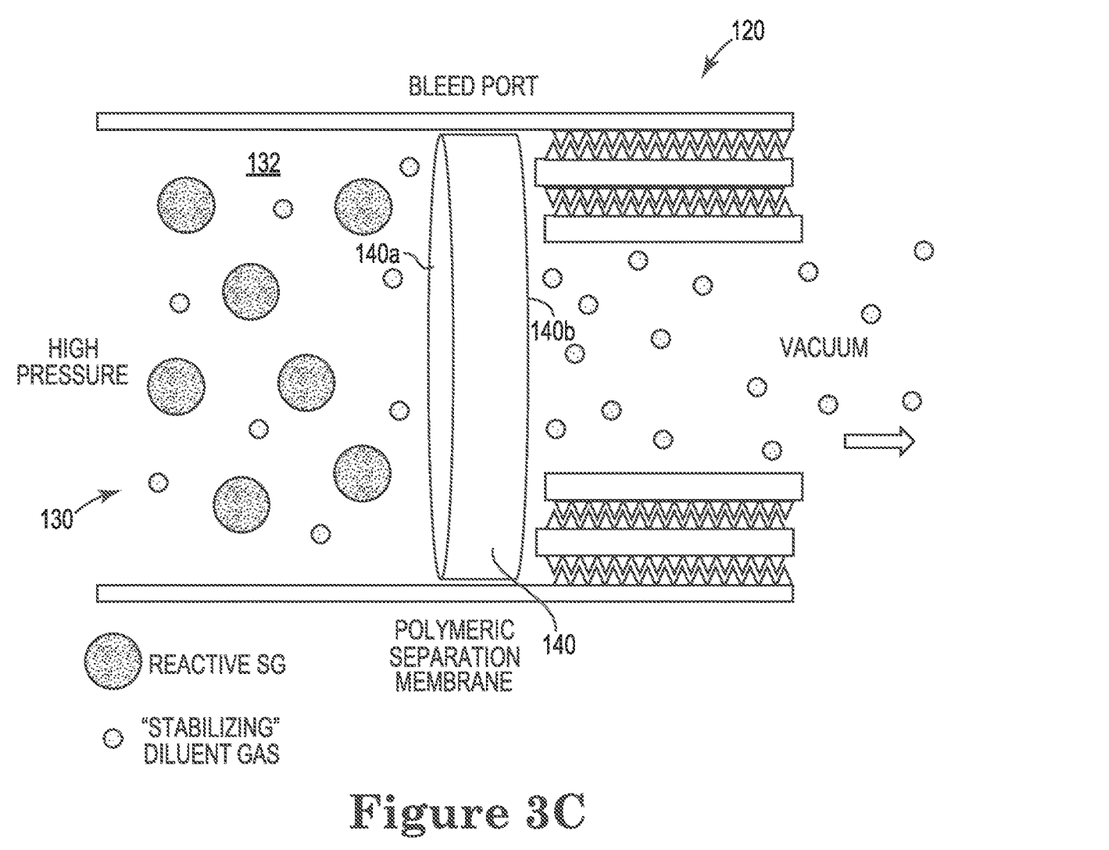

Referring now to FIGS. 3B and 3C, illustrated is an example of a "bleed port" that is included as part of a storage vessel as described herein, that includes a separation membrane as described. The illustrated bleed port allows for a separation membrane to be used to separate a diluent gas (or another gas) from a gas mixture that contains the diluent gas and a second gas, which may be a reagent gas.

As an example, but not to limit the present description, the bleed port shown at FIGS. 3B and 3C may be incorporated into a storage vessel in a manner shown at FIG. 1. The bleed port may be included in vessel 100 of FIG. 3A as part of a flow channel that includes valve 120 and that accesses interior 130 of vessel 100 of FIG. 3A. Gas mixture 132 contained at interior 130 contacts feed side surface 140a of separation membrane 140. With a reduced pressure applied to permeate side 140b of membrane 140, diluent gas of stored gas mixture 132 is able to pass through separation membrane 140, while reagent gas ("Reactive SG," or reactive specialty gas) is not able to pass through membrane 140 at a substantial rate.

In use, valve 120 can be selectively opened and closed or otherwise actuated to apply a reduced pressure at permeate side surface 140b, to draw diluent gas through separation membrane 140. At FIG. 3B, a valve ("vacuum actuated switch) is closed to prevent flow through membrane 140. At FIG. 3C, the valve is opened and vacuum (i.e., a reduced pressure relative to a pressure at interior 130) is applied to permeate side surface 140b and the diluent gas of gas mixture 132 passes through membrane 140 to be removed from interior 130 to leave a concentrated gas mixture (a retentate) within interior 130. The remaining concentrated gas mixture contains a higher concentration of the reagent gas compared to the original concentration of reagent gas in the original gas mixture 132 that was contained in interior 130 before diluent gas was removed through the bleed port.

Generally, methods and storage systems as described can involve a storage vessel (sometimes referred to as a "package") that contains a stored gas mixture that includes a stabilized reagent gas, e.g., a highly-reactive gas species that is stabilized by a diluent gas during handling, transport, and storage. As desired by a user of the stored gas mixture, the diluent gas can be separated from the stored gas mixture by use of a separation membrane (e.g., at a bleed port or otherwise attached to the vessel), to provide a high purity, high concentration reagent gas (e.g., a reactive specialty gas). The concentrated reagent gas can be delivered to a manufacturing process, e.g., to a customer's tool, for use in a processing step that may have improved process control and efficiency due to the reagent gas being provided as a higher concentration raw material.

Figure 3D:
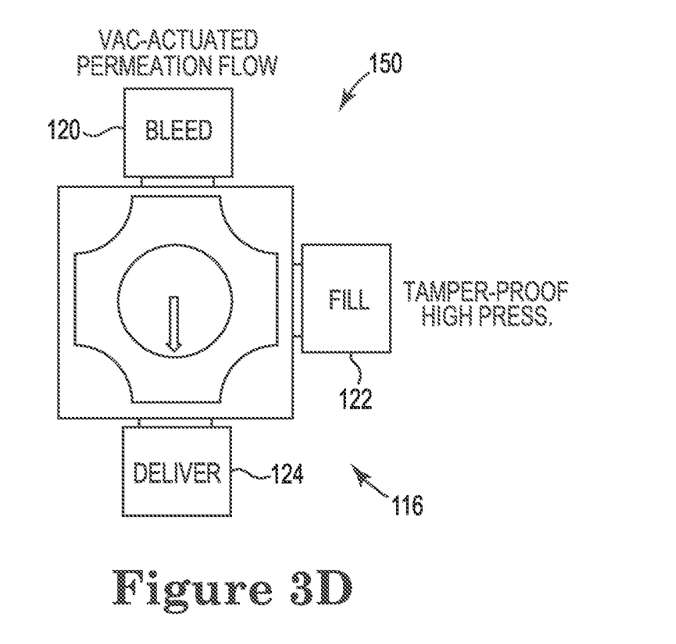
FIG. 3D shows an example of a useful flow control component of a vessel as described.

Referring to FIG. 3D, an upper opening or neck 116 of an example storage vessel (not shown) (e.g., 100 of FIG. 3A) may include a multi-port valve assembly 150 which includes: A) a high-pressure "fill" port 122, B) a lower (or regulated) pressure "delivery" port 124, and C) a "bleed" port 120 for selective extraction of diluent or stabilizing gas species via vacuum. The vessel can contain reagent gas and diluent gas. A user may connect the vessel to manufacturing equipment, e.g., a semiconductor processing tool, e.g., an ion implantation tool or a deposition too. After the vessel is installed and connected to the tool, and prior to delivering the stored reagent gas to the tool, diluent gas can be removed from the vessel to increase the concentration of the reagent gas within the vessel to a form a concentrated (e.g., highly pure or substantially pure) reagent gas. The concentrated reagent gas can be delivered to the tool.

FIG. 3D illustrates a top view of valve assembly 150. Port 120, a bleed port, uses a check valve (or vacuum actuated orifice) and a separation membrane that allows a flow of the diluent gas but substantially prevents flow of reagent gas through the membrane via a physical separation based on differentiation of molecular size and membrane permeation rate. A diluent gas such as hydrogen or helium can readily pass through the separation membrane when vacuum is applied on the permeate side of the membrane, but a reagent gas having a larger molecular size, such as germane, silane, diborane, digermane, diacetylene, stibene, etc., has a minimal or insubstantial rate of passage through the membrane.

Example valve assembly 150 includes a handle that can be moved between three locking and visually indicated positions: "Bleed," "Fill," and "Deliver." When the vessel is fully and safely installed on a manufacturing tool, the diluent "stabilizing" gas of the stored gas mixture can be separated from the stored gas mixture by setting the valve assembly at bleed, to allow the diluent gas to flow through a separation membrane and out of bleed port 120. Preferentially removing much or most of the diluent gas causes a substantially increased concentration of pure reagent gas (a.k.a. "reactive specialty gas") to remain at the vessel interior, which can be delivered to the process tool through the "Deliver" port at high concentration and high purity.

Until the vessel is attached to the customer's tool, and the diluent gas is safely bled through the separation membrane from the cylinder via vacuum applied to the "Bleed" port, the vessel can be in a state that meets all transportation and storage requirements for maximum safety.

The methods, storage systems, and apparatus presently described can be useful for processing any type of a gas mixture to remove or separate one constituent gas contained in the gas mixture from a different constituent gas of the gas mixture and from the gas mixture itself. The present methods, systems, and apparatus can be especially useful to separate a diluent gas from a high value gas, such as a reagent gas, especially a highly reactive reagent gas, to form a more concentrated reagent gas.

Advantageously, relative to previous gas storage systems and delivery methods, a reagent gas can be contained, stored, and transported in a storage vessel in combination with a diluent gas, which is included in the gas mixture to allow for safer storage, transport, and handling of the reagent gas, but at least a portion of the diluent gas can be separated from the reagent gas before the reagent gas is delivered for use. When the stored gas mixture is received by a user, the stored gas mixture contains a high amount of the diluent gas. The user may separate the two gases (e.g., remove a portion of the diluent gas from the stored gas mixture) and use the reagent gas at a concentration that is higher than the concentration of the reagent gas in the stored gas mixture. A method as described allows a user to remove the diluent gas from the stored gas mixture, to increase the concentration of the reagent gas to a higher concentration that is more useful and effective for certain types of processes that involve the reagent gas. The user can separate the diluent gas from the reagent gas to increase the concentration of the reagent gas and produce a raw material gas of a higher concentration compared to the stored gas mixture (referred to as a "concentrated gas mixture" or a "concentrated reagent gas").

Figure 4:
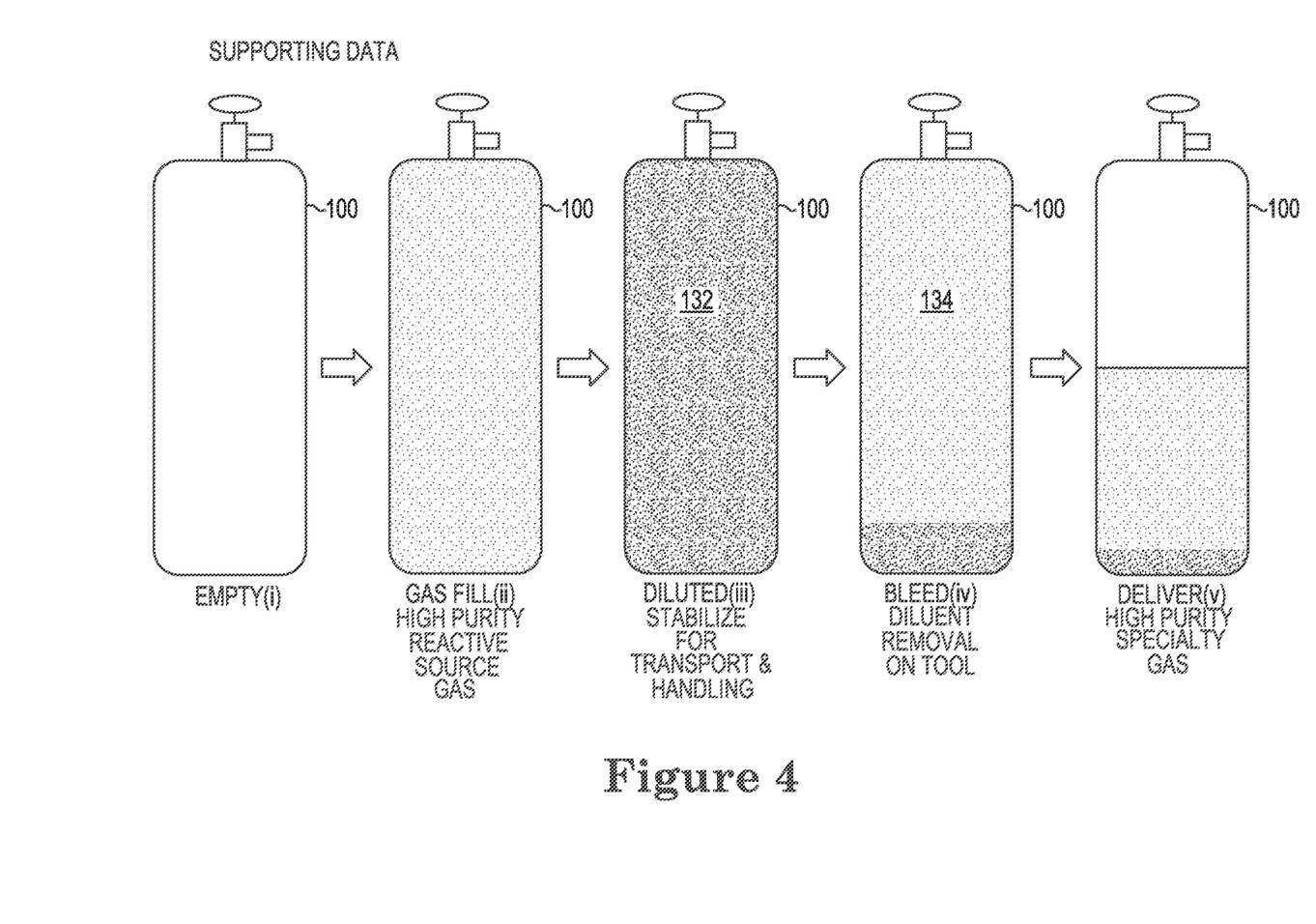
FIG. 4 shows an example of steps of a storage and delivery method as described.

The storage system and methods as described allow for several different methods of removing a diluent gas from a stored gas mixture to produce a concentrate gas mixture. One example of a useful method is shown schematically at FIG. 4. FIG. 4 shows a storage vessel 100 (e.g., as shown at FIG. 3A) in an empty state (i). In any order, both a first gas (e.g., a reagent gas) and a second gas are added to the vessel interior; see (ii) and (iii). For a first gas that is a reactive reagent gas, and a second gas that is a diluent gas, the amounts of these two gases in the stored gas mixture can be as desired for added safety and stability during storage, transport, and handling. The vessel of stage (iii), containing the stored gas mixture 132 of the first gas and the second gas, can be safely transported, stored, handled, delivered to a user, and connected to a processing tool, while both gases are contained within the vessel.

The user, however, may wish to use the reagent gas at a concentration that is higher than the concentration of reagent gas in the stored gas mixture 132 as the mixture was stored and transported in vessel 100. The user may remove an amount of the diluent gas from stored gas mixture 132 by causing an amount of the diluent gas to be separated from the stored gas mixture through a bleed port of vessel 100 (see iv). (Because FIG. 4 is a schematic representation, vessel 100, in form (iv), is depicted as containing a reduced amount of the diluent gas with the entire (reduced) amount of the diluent gas being shown at the bottom of vessel 100. In an actual vessel that contains actual gases, both gases would be uniformly dispersed within the interior of vessel 100. The same applies to (iv) and (v) of FIG. 5.)

Figure 5:
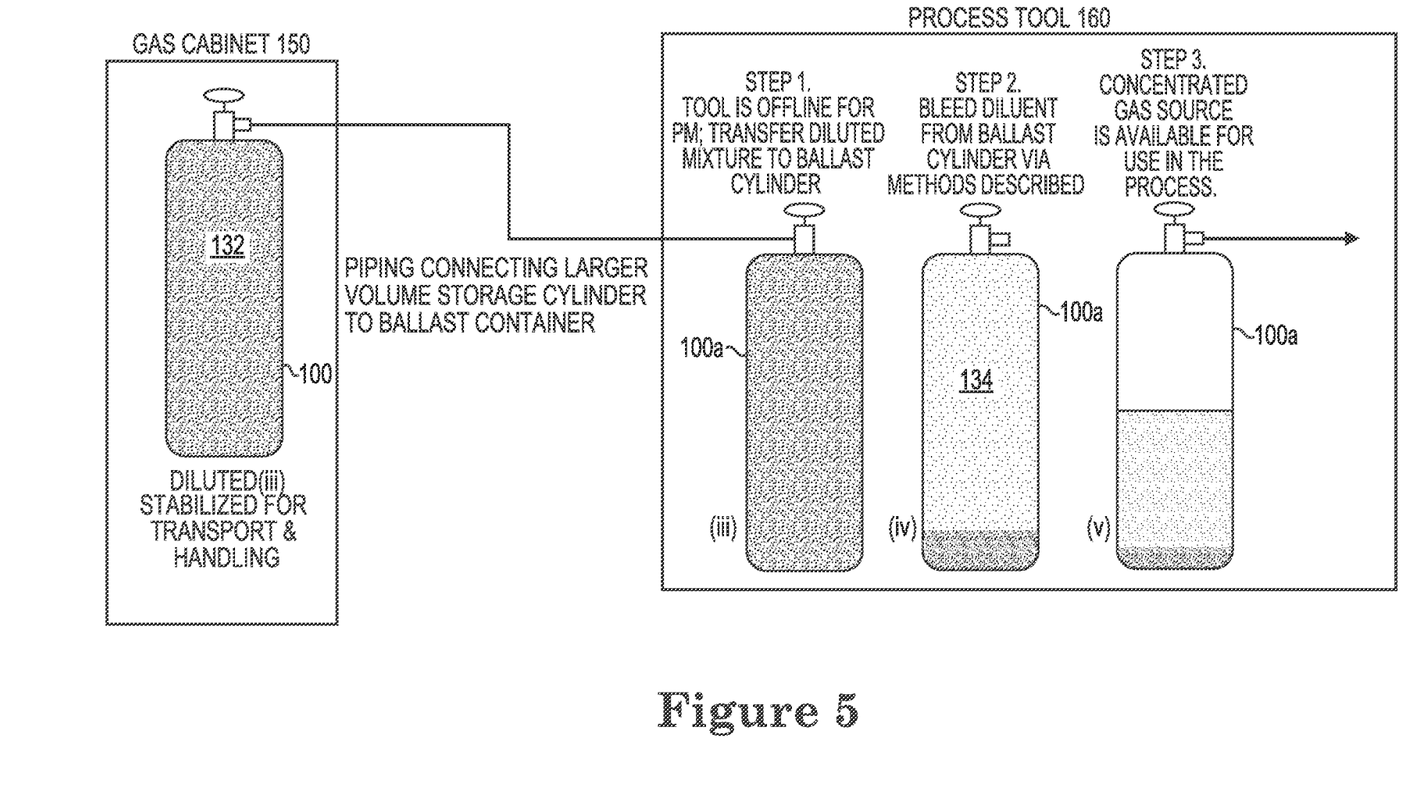
FIG. 5 shows an example of steps of a storage and delivery method as described.

By removing a portion of, or substantially all of, the diluent gas from stored gas mixture 132, a concentrated reagent gas (134) is produced and remains at the interior of vessel 100. Concentrated reagent gas 134 can be dispensed from vessel 100 for use in a manufacturing process. By this method, the diluent is removed from the stored gas mixture in a single step, to produce concentrated reagent gas 134 in vessel 100. (Again because FIG. 5 is a schematic representation, vessel 100 in form (v) is depicted as containing a reduced amount of concentrated reagent gas 134 by showing the gases at the bottom portion of vessel 100, with an upper portion being depicted as empty. In an actual vessel that contains actual gases, both gases would be uniformly dispersed within the interior of vessel 100.)

As a single example, a highly reactive, high value source reagent gas such as germane might be diluted in the range of 50 to 85 percent by a diluent or stabilizing gas such as hydrogen; i.e., the stored gas may contain from 50 to 85 percent diluent or stabilizing gas and from 15 to 50 percent germane (by volume). When received by the customer, the application may require a germane concentration of 75 to 85 percent (by volume) or more, and much of the diluent hydrogen must be removed to increase the germane concentration in the stored gas mixture from the range of 15 to 50 percent up to a concentration of from 75 to 85 percent. A portion of the reagent gas may also be expected to be removed through the separation membrane and lost. A preferred efficiency of removing diluent or stabilizing gas relative to the reagent gas (selectivity) may desirably maximize yield of the high value source reagent gas.

By an alternate method, stored gas mixture 132 can be removed from vessel 100 in multiple portions, using multiple delivery steps, and each of the different removed portions can be formed into a concentrated reagent gas. From each portion of gas mixture that is removed from vessel 100, diluent gas can be removed, and smaller volumes of concentrated reagent gas 134 are formed.

Referring to FIG. 5, a high volume vessel 100 (as described) contains a large volume of stored gas mixture 132, and is contained in gas cabinet 150 or alternately may be within a process tool, either of which is within a clean room. A portion of the total volume of gas mixture 132 contained in vessel 100 is transferred to a smaller-volume vessel 100a (sometimes referred to as a ballast vessel), which may be associated with, located within, or connected to a process tool (160). This step may be performed while process tool 160 is undergoing planned maintenance (PM). With the portion of gas mixture 132 contained in vessel 100a, an amount of the diluent gas of stored gas mixture 132 can be removed from vessel 100a through a bleed port of vessel 100a (see iv and step 2). A concentrated reagent gas (134) is produced and remains at the interior of vessel 100a. Concentrated reagent gas 134 can be delivered for use to the process tool for performing a manufacturing process.

During step 2, a portion of the reagent gas of gas mixture 132 may also be expected to be removed through the separation membrane and lost, and a useful amount of diluent gas may remain in vessel 100a. The amount of diluent or stabilizing gas that is allowed to remain in ballast vessel 100a can be an amount that is desired for storing the concentrated reagent gas 134 for an expected storage period. For a lengthy period of use (e.g., weeks or months) of concentrated reagent gas 134 in ballast vessel 100a, a larger amount of diluent or stabilizing gas may remain, e.g., at least 5, 10, or 20 percent. For a shorter period of use the amount of diluent or stabilizing gas may be lower, e.g., less than 10 or 5 percent.

When the volume of concentrated reagent gas 134 in vessel 100a is depleted, a second portion of stored reagent gas 132 can be transferred from vessel 100 into vessel 100a. Diluent gas may be removed from the second portion of the stored reagent gas through the bleed portion of vessel 100a. By this method, smaller portions of concentrated reagent gas are stored in vessel 100a, compared to a larger volume of concentrated reagent gas 132 that would be stored in vessel 100 where all of the diluent gas to be removed from vessel 100 in a single step.

In this system, the larger gas source cylinder 100 remains diluted and improves safety and limits a potential decomposition rate of regent gas contained in cylinder 100. Ballast cylinder 100a is designed to contain a suitable level of pressure in the event of decomposition of concentrated reagent gas 134. Ballast cylinder 100a is monitored during use for pressure, temperature, and flow rate, to monitor the amount of concentrated reagent gas 134 contained in ballast cylinder 100a.

According to yet a different method and system, a separation membrane may be used to separate a gas from a stored gas mixture while the stored gas mixture flows through a flow control mechanism that causes the gas mixture to contact the separation membrane. As one example, referring to FIG. 6, stored gas mixture 132, which contains reagent gas and diluent, is flowed from a storage vessel (not shown), optionally through a regulator or check valve (not shown), into an inlet (202) of concentrator 200. Concentrator 200 includes feed inlet 202, chamber 204, outlet 206, and separation membrane 208 (within chamber 204) in the form of a tube or conduit. Concentrator might also include a temperature control feature (not shown) to maintain the membrane at a relatively constant temperature for improved control of permeance rate(s). Feed inlet 202 leads to feed side space 212 at the interior of membrane 208, and that is defined by inlet 202, an interior side of separation membrane 208, and outlet 206. Chamber 204 contains membrane 208 within a chamber space (permeate space) 210.

Figure 6:
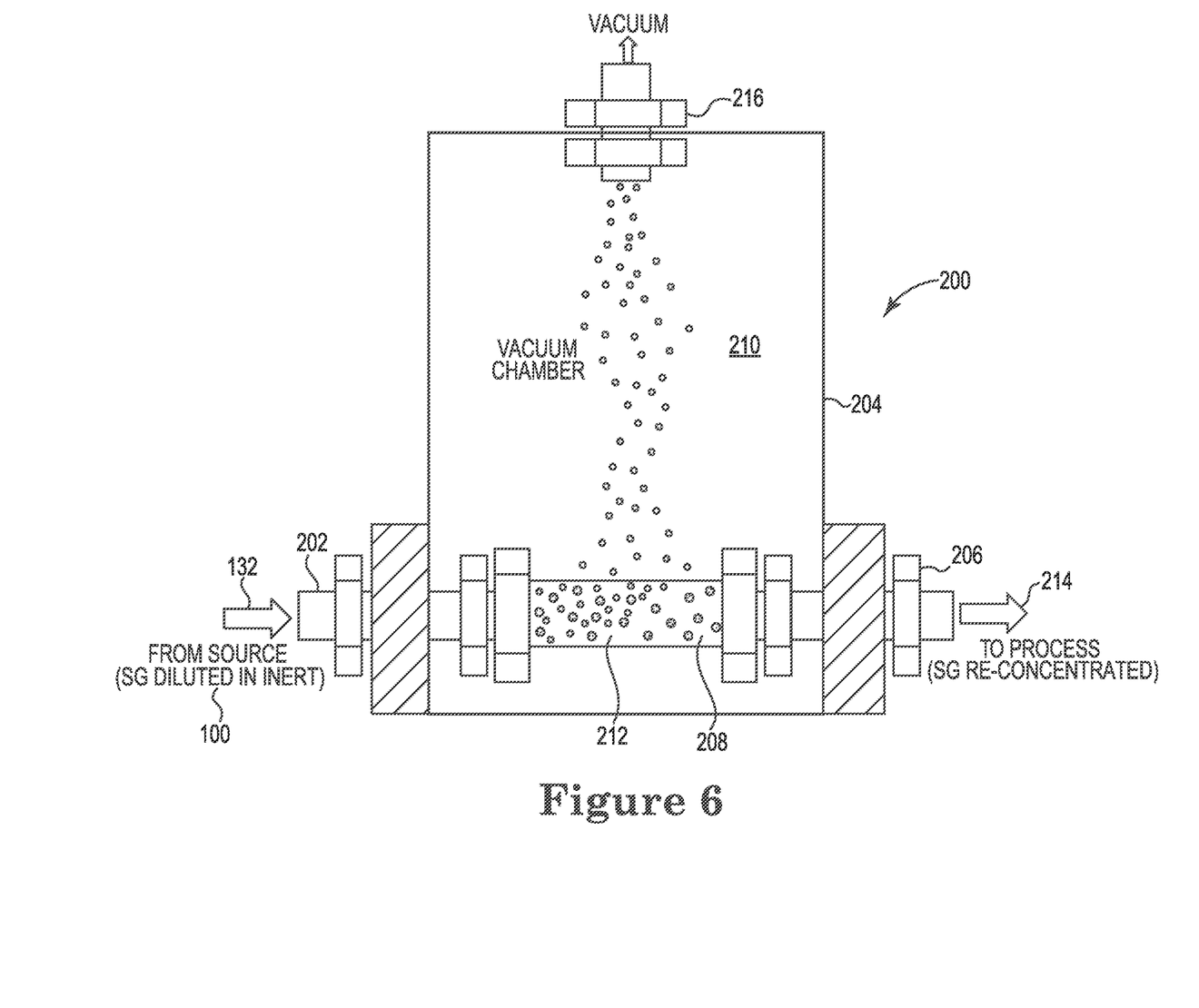
FIG. 6 shows an example of steps of a delivery method as described.

In use, feed gas, i.e., stored gas mixture 132, flows (optionally through a regulator, check valve, needle valve, or restricted flow orifice, not shown) through inlet 202 and into feed side space 212. Vacuum is applied to permeate space 210 to produce a reduced pressure at permeate space 210 relative to feed side space 212. Stored gas mixture enters and flows through feed side space 212. During flow through feed side space 212, a portion of stored gas mixture 132, e.g., diluent gas, passes through separation membrane 212, enters permeate space 210, and can be removed from permeate space 210 through valve 216. The remaining portion of the stored gas mixture is a concentrated reagent gas that contains a lower concentration of the diluent gas, and a higher concentration of the reagent gas. This concentrated reagent gas flows out of outlet 206 as retentate 214 and can be delivered to a manufacturing apparatus such as a semiconductor processing tool.

A potential benefit of a system of FIG. 6 is a continuous removal of stored gas mixture 132 from a vessel. The stored gas mixture that remains in the vessel is fully diluted and fully stabilized until concentrated in situ at point of use. The diluted form of the gas mixture is more stable, and is more safely stored, compared to a concentrated reagent gas. The diluted stored gas mixture may experience reduced decomposition over time, and the supply of the stored reagent gas may be used over a period of several months.

The invention claimed is:

1. A method of processing a stored gas mixture contained in a storage vessel, the stored gas mixture comprising reagent gas and diluent gas, the method comprising:
contacting the stored gas mixture with a separation membrane that allows preferential flow of the diluent gas through the separation membrane relative to the reagent gas;
allowing a portion of the diluent gas of the stored gas mixture to flow through the separation membrane to produce a concentrated reagent gas having an increased concentration of the reagent gas compared to the stored gas mixture; and
removing diluent gas from the storage vessel, through the separation membrane, to produce the concentrated reagent gas within the storage vessel.

2. The method of claim 1, the separation membrane having a permeate side and a retentate side, the method comprising:
contacting the stored gas mixture with the retentate side, at a retentate-side pressure, and
applying a permeate-side pressure to the permeate side, the permeate-side pressure being lower than the retentate-side pressure, to cause diluent gas to flow through the membrane and to produce the concentrated gas mixture on the retentate side.

3. The method of claim 1, wherein:
the stored gas mixture comprises less than 40 percent reagent gas, and
the concentrated gas mixture comprises at least 60 percent reagent gas.

4. The method of claim 3, wherein the concentrated gas mixture comprises at least 85 percent reagent gas.

5. The method of claim 1, wherein the reagent gas is a hydride and the diluent gas is hydrogen.

6. The method of claim 1, wherein the reagent gas is selected from: $CH_4$, $NH_3$, $H_2O$, $SiH_4$, $PH_3$, $H_2S$, $GeH_4$, $Ge_2H_6$, $AsH_3$, $H_2S$, $H_2Se$, $H_2Te$, $C_2H_2$, $P_2H_4$, $SbH_3$, and $B_2H_6$.

7. The method of claim 1, wherein the diluent gas is selected from: nitrogen, hydrogen, xenon, and helium.

8. The method of claim 1, wherein the separation membrane comprises polydimethyl siloxane, acetate cellulose, polytetrafluoroethylene, a perfluorinate sulfocationite, nanoparticle silica, zeolite, metal-organic framework, nanoporous carbon, or porovskite, a precious metal, polyimide, polysulfone, cellulose acetate, polyaramide, polyethylene, or polyphenylene oxide.

9. The method of claim 1, wherein the stored gas mixture is contained in a first storage vessel having a first volume, the method comprising:
removing a portion of the stored gas mixture from the first storage vessel and adding the portion to a second storage vessel having a volume that is smaller than the first, and
removing diluent gas from the second storage vessel, through the separation membrane, to produce the concentrated reagent gas within the second storage vessel.

10. The method of claim 1, wherein the stored gas mixture is contained in a storage vessel, the method comprising:
delivering a flow of the stored gas mixture from the storage vessel to a concentrator that comprises:
the separation membrane having a permeate side and a retentate side,
a flow channel on the retentate side, and
a permeate space on the permeate side,
the method comprising:
flowing the stored gas mixture through the flow channel,
reducing pressure in the permeate space to a pressure that is below a pressure in the flow channel to cause diluent gas to pass through the membrane and into the permeate space, to produce the concentrated reagent gas in the flow channel.

11. The method of claim 1, wherein the concentrated reagent gas comprises at least 90 percent reagent gas.

12. The method of claim 1, comprising delivering the concentrated gas mixture to a semiconductor manufacturing tool.

13. The method of claim 1, comprising delivering the concentrated gas mixture to a semiconductor manufacturing tool for use in a method selected from: chemical vapor deposition, atomic layer deposition, and epitaxial growth.

* * * * *